March 14, 1967

F. J. LUKETA 3,308,567

CASINGS FOR TRAWL LINES

Filed April 30, 1964

INVENTOR.
FRANK J. LUKETA

BY

Reynolds + Christensen

ATTORNEYS

March 14, 1967 F. J. LUKETA 3,308,567
CASINGS FOR TRAWL LINES
Filed April 30, 1964 7 Sheets-Sheet 7

INVENTOR.
FRANK J. LUKETA
BY Mattus & Graybeal
ATTORNEYS

United States Patent Office 3,308,567
Patented Mar. 14, 1967

3,308,567
CASINGS FOR TRAWL LINES
Frank J. Luketa, 5567 Greenwood Ave.,
Seattle, Wash. 98103
Filed Apr. 30, 1964, Ser. No. 364,889
18 Claims. (Cl. 43—9)

This application is a continuation-in-part of my prior, now abandoned, application Serial No. 186,087, filed April 19, 1962, and entitled Lines For Trawl Nets.

The present invention relates to trawl net lines, and more particularly to encased trawl net lines having water reaction surfaces formed on the casings thereof, which surfaces are oriented to become active as the line advances so as to produce upward and/or lateral components of force on the line, urging it from a natural vertical and/or lateral catenary curvature, towards a straight line.

It has been explained in my copending, now abandoned, application Serial No. 365,233, entitled, Catenary Countering Means for Trawl Net Lines, that in use the long, widely spreading curtains, curtain lines, and sweep lines of trawl nets bow laterally outwardly and form lateral arcuate curves of catenary shape, due to drag of the water upon the lines, and that such result is undesirable. In that application I disclosed how such curved lines and curtains can be substantially straightened by use of water reaction means. In said application, I disclose the use of a plurality of spaced float elements on the trawl net lines, each said float element being formed to include lower reaction surfaces, and each being so tilted, as by ballasting, for example, that its water reaction surface develops not only an upward buoyant component of force, but also an inward lateral component of force. By careful disposition of such floats, or by variation in their tilting, the varying outward bowing tendency of the net lines, produced by water resistance or drag, can be countered and substantially overcome, leaving the net lines relatively straight.

The application of floats in the manner described above complicates hauling in of the net by the drum trawling method, wherein all gear is wound upon drums operated by power. The floats, attached to the curtain lines, are not readily reeled in onto the drums, and may snag in the netting and hinder subsequent setting of the net. They can be removed during hauling in and replaced during setting, but this involves a certain amount of time and attention on the part of crew members.

By the present invention the necessity of floats, either for buoyance (or for depression) or for correction of the lateral catenary tendency indicated, is eliminated, as means to accomplish these ends are incorporated in a casing for the lines. Thereby all extraneous accessories can be eliminated, and the encased lines with their built-in buoyant, depressive, and lateral catenary countering means can be readily handled as all ordinary lines are handled. This, then, is the primary object of this invention.

Wherever reference is made herein to a "lateral catenary tendency" or to a like term, it is this tendency of the line to bow laterally as a result of water drag that is referred to. There is also a tendency for the line to droop as a result of gravity forces, and the encased line of the present invention preferably counters such latter tendency as well. The tendency of the line to droop as a result of gravity forces is herein sometimes termed a "vertical catenary tendency."

The aforementioned copending application Serial No. 365,233, entitled Caternary Countering Means For Trawl Net Lines, is a cotinunation-in-part of my prior, now abandoned, application Serial No. 150,577, filed November 6, 1961, and entitled Caternary Countering Trawl Net. In said copending application I claim the generic concepts involved in using water reaction means for countering the lateral catenary tendency of, and/or correctly verticaly orienting, trawl net lines, which concepts may be produced by the apparatus of the present invention.

It is also an object of the present invention to provide an encased trawl net line of the character described, which can be made up of convenient size lengths or sections suitably molded from flexible, wear-resistant materials, at reasonable cost, said lengths being readily connectable together to form a line of whatever total length may be required.

It is a further object of the present invention to provide a line of this general character to which an edge of the net can be readily secured, and the two are equally readily separated.

A still further object of the present invention is to provide a unique combination of an encased trawl net line of the character described, and a trawl net panel wherein said net panel is secured to the casing in such a manner that the drag forces which it produces serve to correctly orient the water reaction surfaces of the casing in the water, to produce the results desired, and prevent undesired movement or fluttering of said casing relative to the net line.

With these objects in view, and others such as wil become apparent as this specification progresses, the invention is shown in representative forms in the accompanying drawings, and is described and claimed hereinafter.

Figures 1, 2, 3:
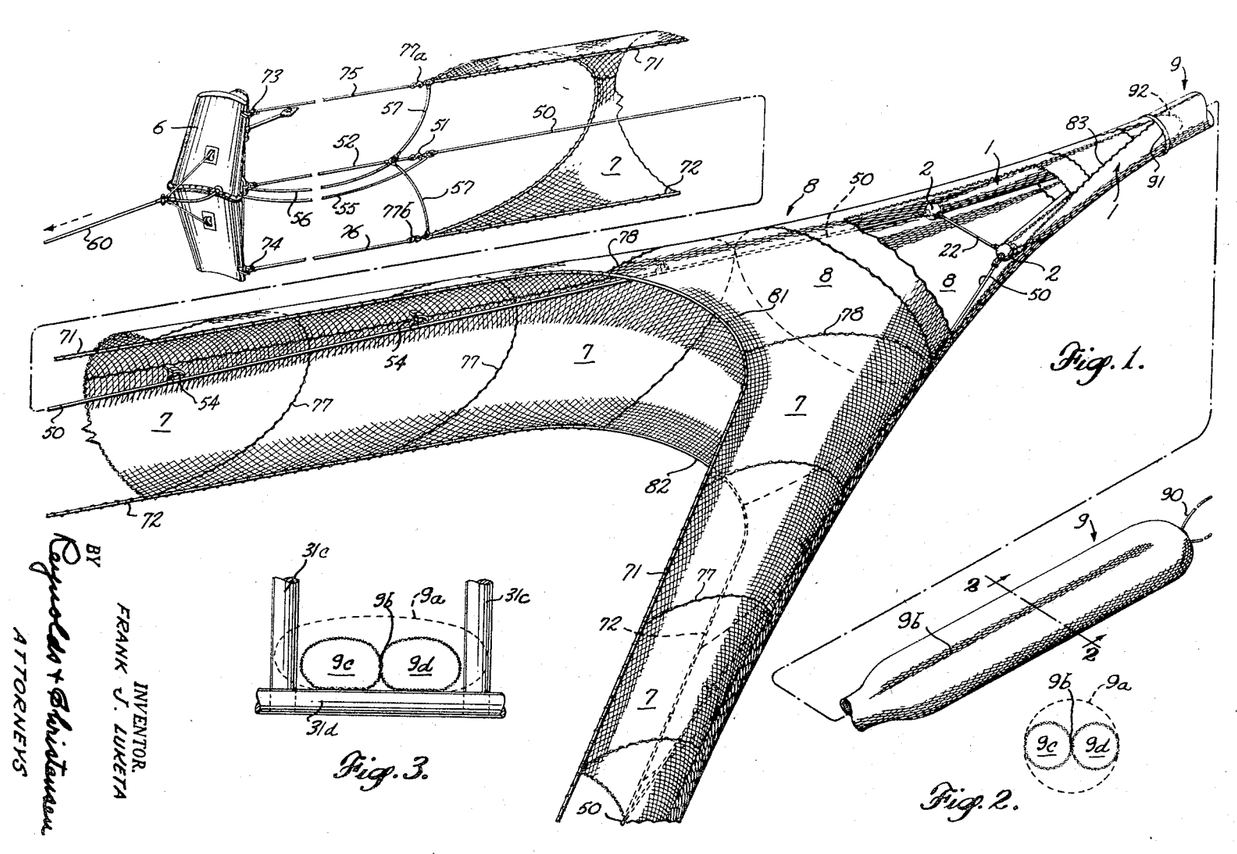
FIG. 1 is an isometric view, partly broken away, of a midwater trawl net of the type to which this invention is applicable, but drawn to a scale too small to show details of the invention.
FIG. 2 is a transverse section through the codend, taken substantially along line 2—2 of FIG. 1.
FIG. 3 is a similar section, but illustrating the codend being hauled in over the stern of the trawler.

The midwater trawl net chosen to illustrate the application of this invention, shown best in FIG. 1, includes a codend 9, closed by a purse line 90 at its after end and connected about its forward end to a rigid expander ring 91. A funnel 8 diverges forwardly from the expander ring to upper and lower bosoms 81, 82 respectively. Suspenders 1 of mesh, which are a part of the funnel and are joined thereto at 83, are distributed at their after ends about the expander ring 91, and at their forward ends are concentrated at laterally spaced connectors 2, which are held against separation by a line 22.

Sweep lines 50, shown buoyed up by floats 54, but which may be buoyed up the casing means of this invention, connect to the connectors 2 and serve to drag the net forwardly. The sweep lines 50 are shown connected at their forward ends to doors 6 through a leg 52 disconnectable at 51. The doors 6 are each towed by a towing warp 60. Upper and lower curtain lines 71, 72 to which the corresponding edges of curtain 7 are secured, diverge forwardly from the opposite ends of the upper and lower bosoms 81, 82 respectively, and from the joints at 78 to the sides of the funnel, and are anchored to the doors 6 at 73, 74 through extensions or leg lines 75, 76, disconnectable at 77a and 77b. Slack lines 55 and 56, the latter connecting to the upper and lower curtain lines 71, 72 by a bridle 57, are in use only during hauling.

For reasons not pertinent to this invention the codend is constricted longitudinally at 9b, so as to divide it into two parallel compartments 9c and 9d and reduce its cross-sectional size from the full-round shown at 9a to a smaller size that may more readily pass between upright guide posts 31c and over a roller 31b at the stern of the trawler, during hauling (FIG. 3).

Figures 4, 5, 6, 7, 8, 9:
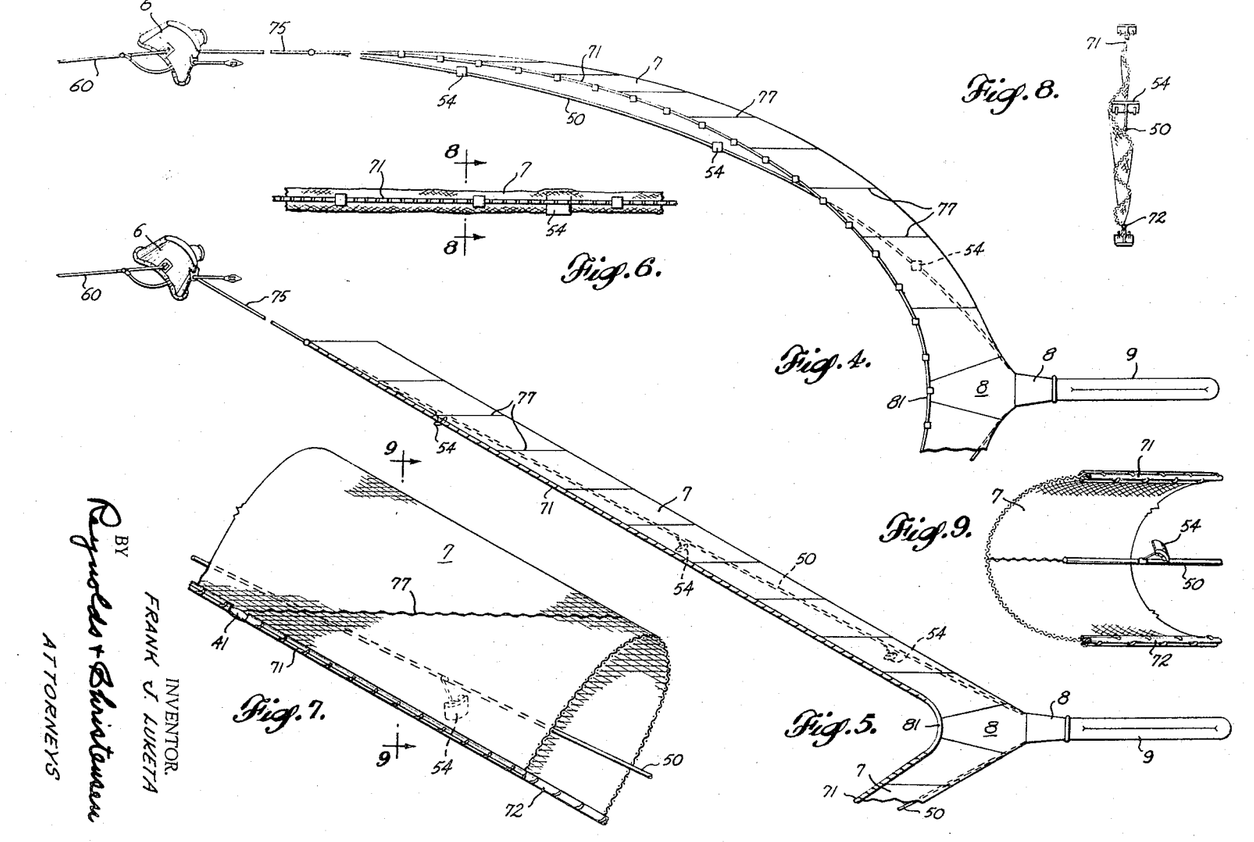
FIG. 4 is a diagrammatic plan view of one side and the codend of a trawl net in use, but lacking any catenary-countering means.
FIG. 5 is a view similar to FIG. 4, but of a net incorporating the caternary-countering means of this invention.
FIG. 6 is a detail plan view of a forward portion of the net of FIG. 4.
FIG. 7 is a view similar to FIG. 6, but of the forward portion of the net of FIG. 5.
FIG. 8 is a sectional view taken substantially along line 8—8 of FIG. 6.
FIG. 9 is a cross-sectional view taken substantially along line 9—9 of FIG. 7.

Referring now to FIG. 4, it has been found that the long curtains, curtain lines, and other lines, which may extend several hundreds of feet between the net proper and the doors, each tend to bow laterally into lateral arcuate or catenary curves because of the drag imposed on them by the water as the net is towed forwardly. The function of the curtain 7 is to belly rearwardly and so to block escape of fish above or below the respective curtain lines 71, 72, and to lead them rearwardly into the funnel and codend. When the leading portion of the curtains is coincident with the direction of advance, or nearly so, as in FIG. 6, the curtain will not belly, but drags rearwardly and hangs more or less vertically, as in FIG. 8, to an extent to enable escape of fish, and may engage the sweep line 50 and any floats 54 thereon, to become entangled therewith. The desired conformation in use is that the lines 71, 72, and the curtains 7 extend as nearly as possible in straight lines from net body to the doors, as in FIG. 5, and when they do the curtains will belly properly, as in FIGS. 7 and 9. The sweep line 50 should also be kept straight rather than bowed in a lateral catenary curve, so that it does not interfere with the curtain 7 while in use.

FIGS. 10–23 illustrate curtain lines which are constructed according to the principles of the present invention and which in use tend to counter drag and gravity forces and to extend generally straight. Of course, the principles and the specific means illustrated can be applied to advantage to the sweep lines. Considering first FIGS. 17 and 18, the encased line has a core of stranded steel cable or the like, designated 30, enclosed within a molded casing 3 of rubber or like material. Instead of forming the casing of circular cross-section it is of hydrofoil shape, being approximately circular in the portion 31 that in use constitutes the nose or leading edge, and cambered to a trailing edge 32. When the line is being drawn forwardly during use, disposed at an angle to the direction of advance, this configuration causes the line to be buoyed upwardly, and to lie with its general plane approximately level. Thereby any need for floats to buoy up the line at intervals is obviated. In the case of the lower curtain line (FIG. 11, lower) a reversal of this shape causes the line to be depressed, eliminating any need for attached weights. Exterior hydrofoils 33, spaced behind the trailing edge portion of the casing and of a similar cross-sectional configuration, serve to redirect the flow of water and decrease drag by preventing turbulence or cavitation as the water tends to break away from the convexly cambered surface of the casing 3.

Figures 17, 18:
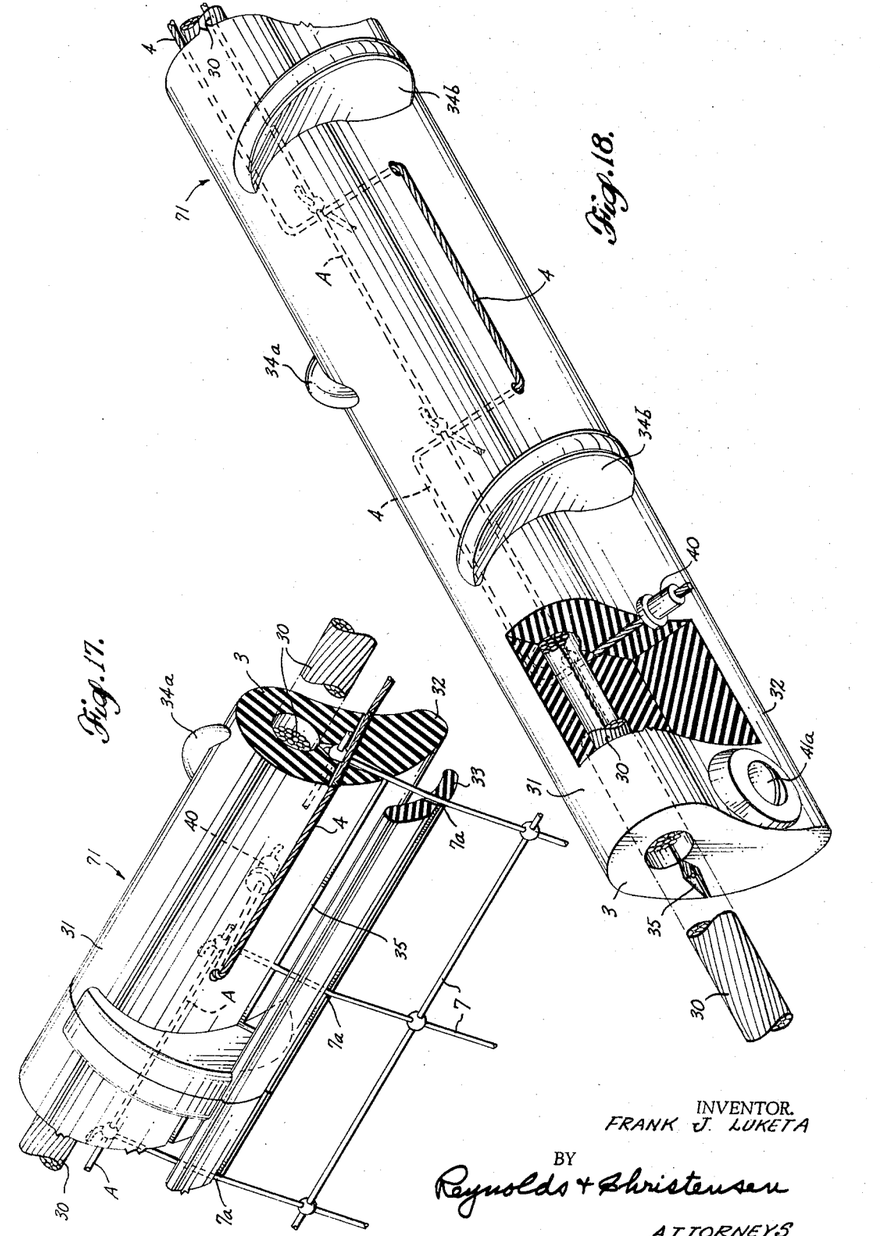
FIG. 17 is an isometric view of an upper curtain line, from the rear and above, illustrating details of construction of such line.
FIG. 18 is a view similar to FIG. 17, partly broken away, but from above and in front.
Figure 19:
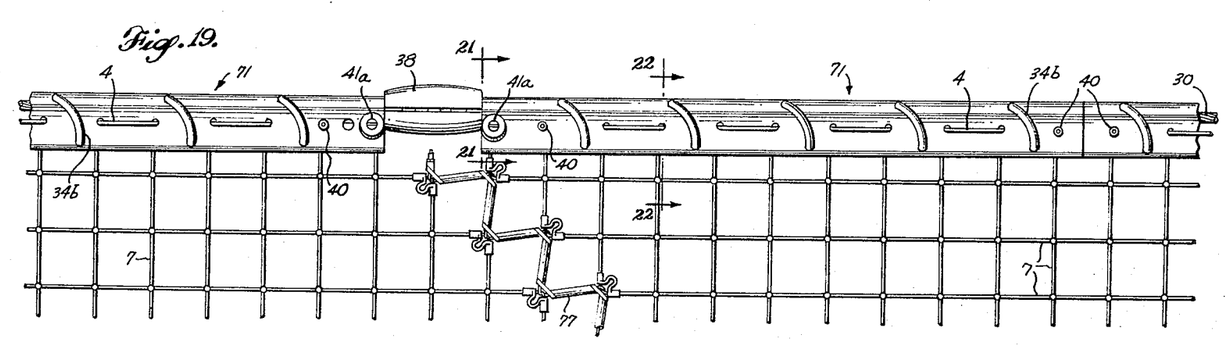
FIG. 19 is an elevational view of a modified form of the line, and of a portion of the curtain hanging vertically therefrom, but not being dragged forwardly.
Figure 20:
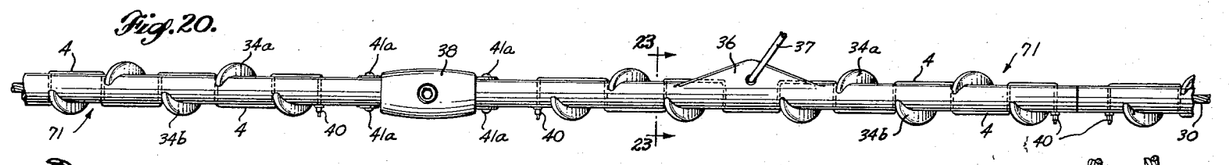
FIG. 20 is an elevational view similar to FIG. 19, but showing the curtain in the position it takes as the line is dragged forwardly.
Figure 21:
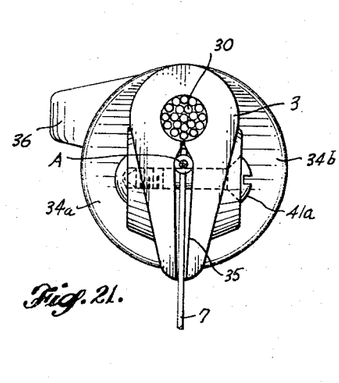
FIG. 21 is a sectional view taken substantially along line 21—21 of FIG. 19.
Figure 22:
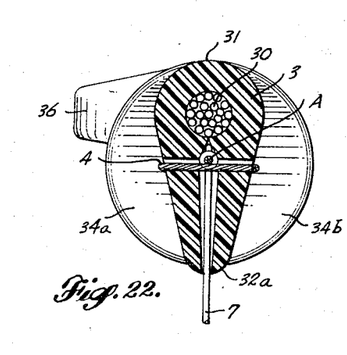
FIG. 22 is a sectional view taken substantially along line 22—22 of FIG. 19.
Figure 23:
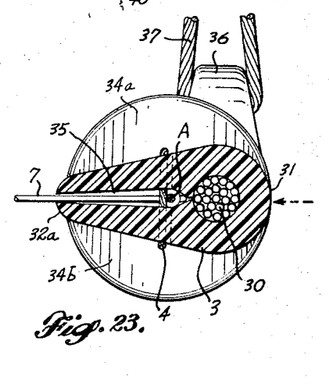
FIG. 23 is a sectional view taken substantially along line 23—23 of FIG. 20.

While the arrangement described can afford adequate lift (or depression) to the line, it is not this that tends to counter the lateral catenary tendency attributed to water drag. Rather, at rather close intervals along the line are placed outstanding vanes or wings 34a, 34b on each of the curtain lines 71 and 72. These are curved in such manner that water reaction as the outwardly divergent line is drawn through the water creates forces urging the line laterally inwardly. The vanes 34a, 34b are arranged in numbers and placement along the line to counter the catenary-creating tendency.

Figures 10, 11, 12, 13:
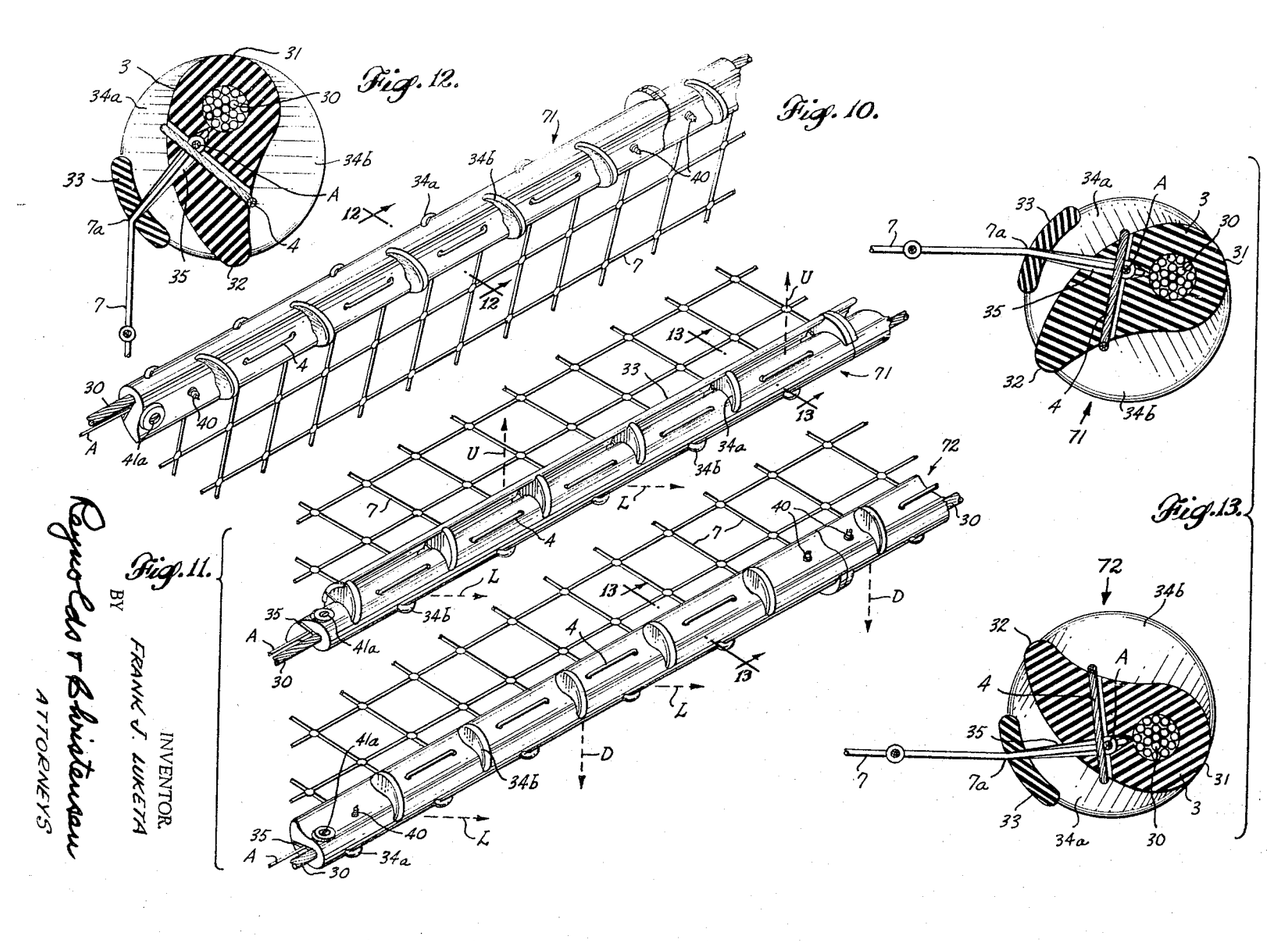
FIG. 10 is an isometric view of an upper curtain line incorporating the invention, at the end of a curtain section, with part of a curtain hanging vertically from the same, the net being stationary, not advancing.
FIG. 11 is an isometric view of the upper and lower curtain lines of an advancing midwater trawl net, with the lines oriented as in use, with portions of the curtain attached to these lines.
FIG. 12 is a transverse sectional view, taken substantially along line 12—12 of FIG. 10.
FIG. 13 is a transverse sectional view through the upper and lower curtain lines at the plane indicated by the line 13—13 of FIG. 11.
Figure 14:
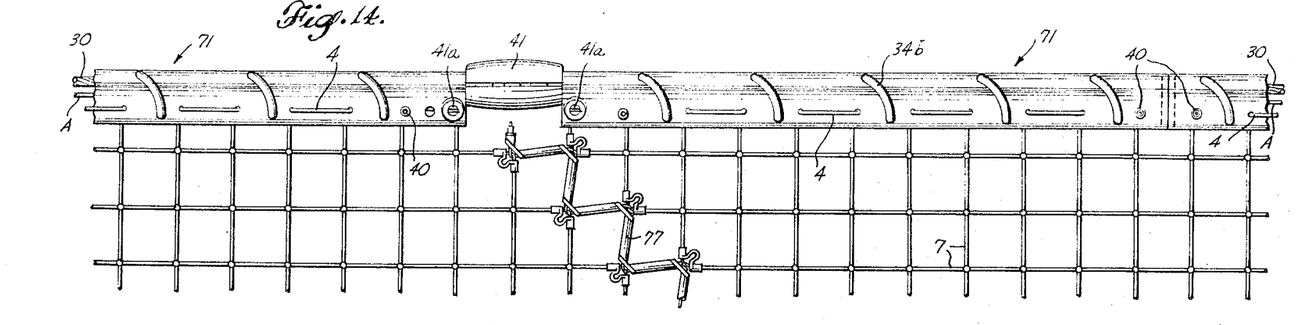
FIG. 14 is an elevational view, from ahead, of an encased curtain line according to the present invention, and with the curtain hanging vertically, being stationary rather than advancing.
Figures 15, 16:
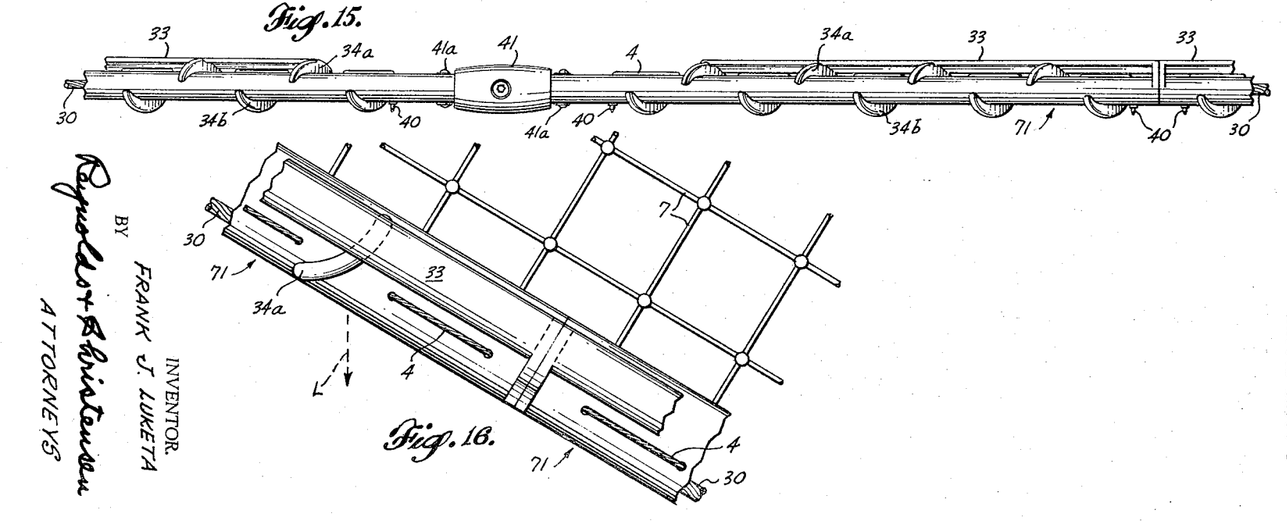
FIG. 15 is a plan view of the arrangement of FIG. 14.
FIG. 16 is an elevational view of the curtain line of FIG. 14, taken from above, with the net advancing.

Referring in greater detail to FIG. 11, the upper and lower curtain lines 71, 72 are shown inclined relative to their direction of advance, which is assumed to be directly towards the observer. The hydrofoil surfaces, of the casing 3 per se and/or of the cambered auxiliary hydrofoils 33, are so oriented that the upper line 71 is buoyed upwardly, and the lower line 72 is depressed, as shown by the respective arrows U and D. If the lower line 72 should tend to sag unduly, as it might in a very long line, the orientation of its hydrofoil surfaces may be reversed, wholly or in part, to buoy it up.

In addition, the water reaction surfaces 34a and 34b are acted upon by the water as the net is drawn forwardly, to produce lateral components of force represented by the arrows L, to urge the line ahead of its natural lateral catenary shape, towards a straight line.

The manner of securement of the edge of the netting to the line or its casing 3 is of some importance. The netting is shown as bar cut along its upper and lower edges, as would be normal in the curtains of a midwater trawl net. The edge bar A of the netting should lie close to the core 30, and the casing 3 is shown slit lengthwise along the portion thereof which is at the rear when all parts are in their respective positions of use. The slit, at 35, divides the casing 3, but leaves it joined at the nose 31. The slit divides not only the casing 3 but also the hydrofoil 33. The casing and hydrofoil being molded of rubber, the whole can be folded back, and the bar A entered within the bottom of the slit 35. To hold the slit closed, and to retain the bar A, a hanging line 4 is threaded back and forth through the casing at intervals, and it is passed through the mesh squares at the edge of the netting in a manner to secure the edge bar A; see FIGS. 12, 13, 17 and 18, and my copending application Serial No. 186,085, filed April 9, 1962, now Patent No. 3,131,501. At suitable intervals the ends of the hanging line 4 are anchored in or secured to the casing 3, as for example by swaging on an enlarged retaining head at 40. Also, retaining screws 41a adjacent the couplers 41 and 38 secure the divided casing portions, across the slit 35. Thus, the edge bar of the netting is secured to the line, and also the casing slit is closed and held closed until the hanging line 4 and the screws 41 are removed. Thereby the casing is also secured to the core 30.

The arrangement heretofore described includes not only the catenary-countering vanes 34a and 34b, but also the lift (or depressive) capability of the casing 3. In the alternative arrangement of FIGS. 19 to 23 the lift-producing elements are omitted from the casing, and lift is produced as before, by attached hydrofoil floats. Here the trailing edge 32a extends symmetrically straight behind the nose 31 so that in use water reaction on the curtains and casing lifts the trailing edge to a level with the nose, from the positions of FIG. 21 and FIG. 22 to that of FIG. 23, and the streamlining thus reduces drag. Bosses 36 formed on the casing 3 serve an anchorage for lines 37 which are anchored at their opposite ends to floats (not shown) which produce the buoyant (or to weights which produce the depressive) force. The catenary-countering vanes 34a and 34b are still formed on the casing 3, and function as previously described.

The curtains and their curtain lines are normally formed of disconnectable sections for ease of handling. Disconnectable edge fasteners 77 (FIG. 19) join the curtain panels, and couplers 38 join the ends of corresponding sections of the curtain lines.

The casings of the type shown in FIGS. 1 to 18 will afford lift adequate to buoy up the lines, and also will urge the line laterally forward, to counter its natural tendency to lie in a lateral catenary curve. The casing shown in FIGS. 19–23 will produce essentially no lift, but will counter the lateral catenary tendency, and lift can be supplied by applied floats on the lines 37. Since these floats have no catenary-countering function the same type of floats can be used at all anchorages 36, and these can be spaced at regular intervals. Such floats can be removed as the net is hauled and replaced as it is set, and no care need be taken to replace them in any given sequence.

The sweep line 50 may also be provided with a lateral catenary-countering casing with buoyant means built into it, as described for the curtain lines. This is of somewhat lesser importance in the sweep lines in that these need not be buoyed up at as frequent intervals (because they are not weighted by the curtains), and if the presence of floats such as 54 is undesirable or impedes reeling in of the lines, these few large hydrofoil floats can be removed readily during hauling and replaced during setting.

It will be noted (see FIG. 13) that tension in the curtain panel 7 caused by water drag produces a moment arm on the casing 3 at point 7a to induce an attack angle in the hydrofoil which in turn produces the desired lift or depression. The pull of the curtain netting 7 on the casing 3 at locations offset rearwardly of the core 30 stabilizes the casing 3 and prevents it from swinging, flapping or twisting freely about the core 30. The pull or drag of the netting on the casing 3 serves to correctly orient and maintain the casing 3 in its intended position of use so that it will perform its intended function. Thus it may be said that the drag of the netting serves to hold the casing 3 at the desired angle of attack in the water such that it will form its lateral catenary-countering and/or vertical orientation function.

Figure 24:
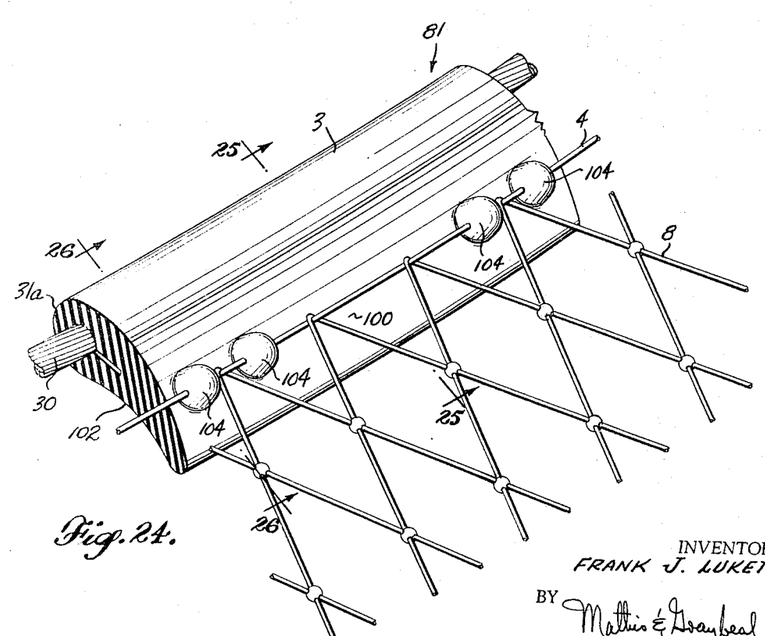
FIG. 24 is a fragmentary isometric view of the upper bosom portion of the trawl net, such view being taken from above and to the rear at the upper bosom, and such view showing a particular manner of securing the encased line at the bosom with the forward edge of the upper panel of the net's funnel.
Figures 25, 26, 27:
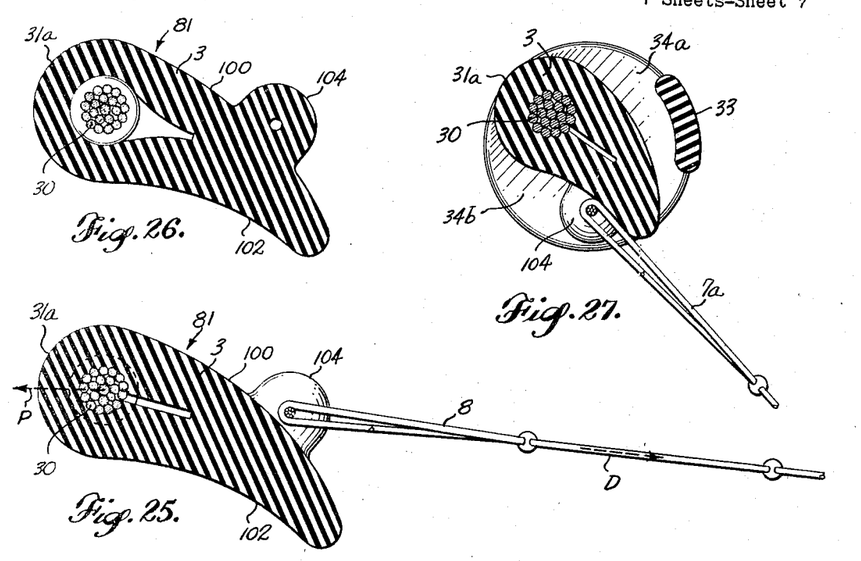
FIG. 25 is a transverse sectional view taken substantially along line 25—25 of FIG. 24.
FIG. 26 is a view similar to FIG. 25, but taken through one of the hanging line receiving elements on the casing, substantially along line 26—26 of FIG. 24.
FIG. 27 is a transverse sectional view taken through a side portion of the curtain line whereat the curtain of the net is more steeply sloped, such view showing the hanging line receiving elements being placed below rather than above the casing at such location.

FIGS. 24–26 show the desired configuration of casing 3 at the bosoms 81, 82 of the net whereat there is no lateral catenary curvature problem. At the bosoms 81, 82 it is only necessary that the casing 3 be provided with surfaces that will produce a vertical component of force, an upward buoyant force (as in the case with upper bosom 81) or a downward depressive force (which is normally the case with lower bosom 82).

In FIGS. 24–26 the casing 3 for the upper bosom 81 is shown as having lateral cross-sectional configuration consisting of a rounded nose 31a, an upper convex surface 100 and a lower concave surface 102, which upper and lower surfaces approach each other as they extend to the rear edge of the casing. As perhaps best shown in FIG. 25, the core 30 for the bosom line 81 extends through the casing 3 relatively adjacent the nose 31a thereof. As the net is towed through the water the core line 30 exerts a substantially uniform and constant forward pull on the casing 3, as diagrammatically illustrated by the force arrow P, representing the forward pull. The upper mesh panel of the funnel 8, shown to be point cut, is secured to the casing 3 by a hanging line 4 extending through openings in bosses 104 formed at intervals on the upper surface 100 of the casing and being woven through the individual meshes of the said upper panel between the bosses 104. The disposition or attitude of the upper panel of funnel 8 is fixed by the construction of the net and is close to horizontal just rearwardly of the upper bosom. More accurately, the upper panel of the funnel 8 inclines forwardly slightly as it approaches the upper bosom, as is illustrated in FIG. 25. The disposition of said upper panel indicates the direction of action of the drag force exerted on casing 3 by the funnel 8, and such force and its direction are indicated in FIG. 25 by the force arrow D, representing the "drag" force.

As the net is towed forwardly, the forward pull of the core 30 on the front of the casing 3, is represented by arrow P, and the drag force on the casing by the arrow D. Consequently the hydrofoil casing 3, which pivots about core 30, and its water reaction surfaces will be held and maintained in a position or attitude of attack, to provide lift or depression, as determined by the placement of bosses 104 on casing 3.

FIG. 27 is a transverse sectional view taken through the casing 3 in a region of a bottom trawl net curtain 72 on the side of a net opposite the midwater trawl net curtain 7 shown in FIG. 13. The slope of the curtain 72 is much steeper than is the slope of the upper panel of the funnel 8 immediately rearwardly of the upper bosom 81 (FIG. 25 situation). In the arrangement of FIG. 27, the bosses 104 are located below the casing 3 in order to orient casing 3 in the manner necessary to give the water reaction surfaces the desired angle of attack. It will be readily apparent that the placement of the bosses 104 on the casing 3 is dependent upon the disposition or attitude of the mesh panel at any given location, and must always be at the location which will produce the desired angle of attack of the water reaction surfaces.

Although all figures, with the exception of FIG. 27, illustrate midwater trawl nets, it is to be understood that the present invention, suitably modified, is applicable to bottom trawl nets also.

It should be noted here that, although the ideal condition of the curtain lines and sweep lines during trawling may be a perfectly straight line, in actual practice this would be very difficult, if not impossible, to achieve under the varying conditions of tide, towing speed, etc. encountered in commercial trawling, without the addition of perhaps self-defeating complexities of some form of automatic line straightening responsive to sensors. However, with the teachings of the present invention, a substantially straight condition of the said lines can be maintained during trawling, although not at the same degree of near-straight at all times.

From the foregoing, further variations, adaptations, and modifications of line casings with water reaction surfaces thereon, and various arrangements thereof with the line elements of trawl nets, can be evolved by those skilled in the art to which the present invention is addressed, within the scope of the following claims.

What is claimed is:

1. In combination, a flexible line, and a casing enclosing said line having integral vanes providing water reaction surfaces thereon set at an angle with respect to the longitudinal axis thereof so that relative water movement during line advance will act upon said water reaction surfaces to hydrodynamically generate unbalanced transverse forces along said line.

2. In combination, a flexible line which in use is towed diagonally through the water and tends to bow or deflect laterally and assume a lateral arcuate curvature due to water pressure on its frontal area, and a casing enclosing said line having integral vanes providing water reaction surfaces thereon set at an angle with respect to the longitudinal axis thereof so that relative water movement during line advance will act upon said water reaction surfaces to hydrodynamically generate unbalanced lateral forces along said line directed to urge the line from said lateral arcuate curvature, towards a laterally straight line.

3. The combination of claim 2, wherein said casing also includes integral water reaction surfaces set at an angle with respect to a horizontal plane so that relative water movement during line advance will act upon said water reaction surfaces to hydrodynamically generate unbalanced vertical forces along said line.

4. In combination, a flexible line, and a casing enclosing said line having integral water reaction surfaces thereon set at an angle with respect to a horizontal plane so that relative water movement during towing will act upon said water reaction surface to hydrodynamically generate unbalanced vertical forces along said line.

5. The combination of claim 4, wherein the casing comprises a blunt nose, a relatively sharp trailing edge, and side surfaces joining the nose and the trailing edge.

6. The combination of claim 5, wherein said casing further includes integral water reaction surface means offset from the trailing edge portion of said casing.

7. The combination of claim 6, wherein said line when in use is towed diagonally through the water and tends to bow or deflect laterally and assume a lateral arcuate curvature due to water pressure on its frontal area, and said casing also includes integral vanes providing water reaction surfaces set at an angle with respect to the longitudinal axis thereof so that relative water movement during line advance will act upon said water reaction surfaces to produce unbalanced lateral forces along the line directed to urge it from its natural lateral arcuate curvature, towards a laterally straight line.

8. In combination with a trawl net panel, a line, a casing enclosing said line and extending along an edge of said panel, means to secure said edge to the casing, means incorporated in the casing and located radially outwardly of the line, engaging the panel with the casing and by at least water drag upon the panel as it advances imposing a moment upon the casing to rotate the casing about the axis of the line into a given disposition, said casing being formed with integral water reaction surfaces which are oriented by the imposition of the moment aforesaid into an angle with respect to a horizontal plane, so that during line advance relative water movement will act upon said water reaction surfaces to produce unbalanced substantially vertical forces along the line.

9. In combination with a trawl net panel which in use is disposed diagonally relative to the direction of advance, an encased line extending along an edge of said panel, means to secure said edge to said encased line, means incorporated in the encased line engaging the panel with said line, and by drag upon the panel as it advances imposing a moment upon the line to rotate the line about its axis into a given disposition, said line being formed with integral vanes providing water reaction surfaces set at an angle upon its casing which are oriented, by the imposition of the moment aforesaid, into an angle of attack, so as to produce unbalanced lateral forces upon the line, by water reaction, for urging the line from an arcuate lateral curvature towards a straight line.

10. In combination, a trawl net line, a casing enclosing said line having integral water reaction surfaces thereon, and a trawl net panel secured along one edge to a portion of said casing offset from the line axis and exerting a drag force on said casing, which force serves to set the water reaction surfaces of the casing at an angle with respect to a horizontal plane so that relative water movement during line advance will act upon said surfaces to hydrodynamically generate unbalanced vertical forces on the line.

11. The combination of claim 10, wherein the line also has vanes on its casing providing water reaction surfaces thereon dispersed at an angle with respect to the longitudinal axis thereof and set at an angle of attack by the drag forces on the casing so that water movement during line advance will act upon said surfaces to hydrodynamically generate unbalanced forces on the line directed to urge it toward a laterally straight line.

12. In combination, a trawl net line, a casing enclosing said line having integral vanes providing water reaction surfaces thereon set at an angle with respect to the longitudinal axis thereof, and a trawl net panel secured along one edge to a portion of said casing offset from the line axis and exerting a drag force on said casing, which force serves to set the water reaction surfaces at an angle of attack so that relative water movement during line advance will act upon said surfaces to hydrodynamically generate unbalanced lateral forces to urge the line towards a laterally straight line.

13. In combination, a casing enclosed trawl net line which in use tends to bow or deflect laterally and assume a lateral arcuate curvature due to water pressure on the casing's frontal area, said casing having integral vanes providing water reaction surfaces thereon, set an angle with respect to the longitudinal axis thereof, and a trawl net panel secured along one edge to a portion of said casing offset from the line axis and exerting a drag force on said casing for orienting the casing in such a manner that the water reaction surfaces thereon assume an angle of attack as the line advances, and the relative water movement during line advance acts upon said surfaces to hydrodynamically generate unbalanced lateral forces along the line for urging it from said lateral arcuate curvature, towards a laterally straight line.

14. The combination of claim 13, wherein said casing also includes water reaction surfaces set an angle of attack by said drag force, and directed to produce vertical forces along said line by water reaction, during line advance.

15. In combination, a flexible towing line, a plurality of transversely projecting integral wings positioned at selected stations along said line, said wings including fluid reaction surfaces set at an angle with respect to the longitudinal axis of said line so that relative fluid movement during line advance will act upon said fluid reaction surfaces to generate unbalanced transverse forces along said line by fluid reaction.

16. In combination, a flexible towing line, a plurality of transversely projecting integral wings positioned at selected stations along said line, said wings including water reaction surfaces set at an angle with respect to the longitudinal axis of said line so that relative water movement during line advance will act upon said water reaction surfaces to hydrodynamically generate unbalanced transverse forces along said line.

17. The combination of claim 16, wherein said towing line includes a blunt nose, a relatively sharp trailing edge, and connecting side surfaces extending from said nose to said trailing edge, and wherein said wings extend outwardly from the side surfaces.

18. The combination of claim 17, wherein said wings extend outwardly from the side surfaces on both sides of said line.

References Cited by the Examiner

UNITED STATES PATENTS

| | | | |
|---|---|---|---|
| 2,397,957 | 4/1946 | Freeman | 114—235 |
| 2,435,956 | 2/1948 | Craig | 114—235 |
| 3,013,356 | 12/1961 | Luketa | 43—9 |

SAMUEL KOREN, *Primary Examiner.*

WARNER H. CAMP, ALDRICH F. MEDBERRY,
*Examiners.*